(12) United States Patent
Dural

(10) Patent No.: US 12,213,014 B1
(45) Date of Patent: Jan. 28, 2025

(54) ENABLING DIRECT CONNECTIVITY BETWEEN DISTRIBUTED UNITS OF RADIO-BASED APPLICATIONS TO IMPROVE POST-HANDOVER RETRANSMISSION PERFORMANCE

(71) Applicant: Amazon Technologies, Inc., Seattle, WA (US)

(72) Inventor: Ozgur Dural, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 284 days.

(21) Appl. No.: 17/808,518

(22) Filed: Jun. 23, 2022

(51) Int. Cl.
*H04W 36/00* (2009.01)
*H04W 76/14* (2018.01)

(52) U.S. Cl.
CPC ....... *H04W 36/0069* (2018.08); *H04W 76/14* (2018.02)

(58) Field of Classification Search
CPC .......................... H04W 36/0069; H04W 76/14
See application file for complete search history.

(56) References Cited

U.S. PATENT DOCUMENTS

| | | | |
|---|---|---|---|
| 8,539,079 | B2 | 9/2013 | Thireault |
| 9,125,047 | B2 | 9/2015 | Sundaresan et al. |
| 9,703,660 | B2 | 7/2017 | Cillis et al. |
| 9,838,268 | B1 | 12/2017 | Mattson |
| 9,876,851 | B2 | 1/2018 | Chandramouli et al. |
| 10,064,242 | B2 | 8/2018 | Pawar et al. |
| 10,135,702 | B2 | 11/2018 | Lahiri |
| 10,244,507 | B2 | 3/2019 | Tarlazzi et al. |
| 10,257,105 | B2 | 4/2019 | Majmundar et al. |
| 10,419,550 | B2 | 9/2019 | Nainar et al. |
| 10,581,717 | B2 | 3/2020 | Tejaprakash et al. |
| 10,594,456 | B2 | 3/2020 | Park et al. |
| 10,608,734 | B2 | 3/2020 | Barbieri et al. |
| 10,705,808 | B2 | 7/2020 | Chiosi et al. |
| 10,749,721 | B2 | 8/2020 | Fertonani et al. |
| 10,750,514 | B2 * | 8/2020 | Fujinami ............... H04W 72/52 |
| 10,817,409 | B2 | 10/2020 | Zeng et al. |
| 10,880,173 | B2 | 12/2020 | Seenappa et al. |
| 10,944,668 | B2 | 3/2021 | Rajagopal |
| 10,959,098 | B2 | 3/2021 | Cidon et al. |
| 10,999,783 | B2 | 5/2021 | Pateromichelakis |
| 11,190,413 | B1 | 11/2021 | Priya et al. |
| 11,356,500 | B1 | 6/2022 | Gupta et al. |
| 11,539,582 | B1 | 12/2022 | Gupta et al. |

(Continued)

OTHER PUBLICATIONS

U.S. Appl. No. 18/146,126, filed Dec. 23, 2022, Diwakar Gupta.

(Continued)

*Primary Examiner* — Michael J Moore, Jr.
(74) *Attorney, Agent, or Firm* — Robert C. Kowert; Kowert, Hood, Munyon, Rankin & Goetzel, P.C.

(57) ABSTRACT

A first distributed unit (DU) of a radio-based application determines that traffic associated with a particular user equipment device (UED) is to be handed over to a second DU. The first DU transmits contents of a buffer, including a data block transmitted from the UED, to the second DU using a direct network channel established between the DUs. The second DU stores the contents in a second buffer, and uses the contents to perform a retransmission operation associated with the traffic of the UED.

20 Claims, 10 Drawing Sheets

(56) References Cited

U.S. PATENT DOCUMENTS

| | | | |
|---|---|---|---|
| 11,546,812 B2* | 1/2023 | Ramamurthi | H04W 24/08 |
| 11,552,842 B2 | 1/2023 | Barabell | |
| 11,720,425 B1 | 8/2023 | Yang | |
| 11,743,117 B2 | 8/2023 | Gupta | |
| 11,800,404 B1 | 10/2023 | Yang | |
| 11,824,943 B1 | 11/2023 | Krasilnikov et al. | |
| 11,916,999 B1 | 2/2024 | Gupta | |
| 11,937,103 B1 | 3/2024 | Krasilnikov | |
| 11,985,065 B2 | 5/2024 | Shevade et al. | |
| 2012/0127151 A1 | 5/2012 | Murakami | |
| 2018/0146375 A1 | 5/2018 | Pawar et al. | |
| 2018/0365635 A1 | 12/2018 | Lucrecio et al. | |
| 2019/0042326 A1 | 2/2019 | Chilikin | |
| 2019/0158606 A1 | 5/2019 | Guim Bernat et al. | |
| 2019/0165906 A1 | 5/2019 | Bala et al. | |
| 2019/0190785 A1 | 6/2019 | Power | |
| 2019/0213029 A1 | 7/2019 | Liu et al. | |
| 2019/0394826 A1 | 7/2019 | Wang et al. | |
| 2019/0289497 A1 | 9/2019 | Rajagopal | |
| 2019/0391855 A1 | 12/2019 | Bernat et al. | |
| 2020/0245229 A1 | 7/2020 | Horn et al. | |
| 2021/0006944 A1 | 1/2021 | Raghothaman et al. | |
| 2021/0058826 A1* | 2/2021 | Mao | H04W 28/088 |
| 2021/0073047 A1 | 3/2021 | Bhandaru | |
| 2021/0092650 A1* | 3/2021 | Ramamurthi | H04W 24/08 |
| 2021/0144517 A1 | 5/2021 | Guim Bernat et al. | |
| 2021/0144555 A1 | 5/2021 | Kim et al. | |
| 2021/0195674 A1* | 6/2021 | Park | H04W 76/18 |
| 2021/0243770 A1 | 8/2021 | Roessler | |
| 2021/0271517 A1 | 9/2021 | Guim Bernat | |
| 2022/0030117 A1 | 1/2022 | Young et al. | |
| 2022/0046084 A1 | 2/2022 | Nair | |
| 2022/0070734 A1 | 3/2022 | Rajagopal | |
| 2022/0141749 A1* | 5/2022 | Luo | H04W 36/305 370/331 |
| 2022/0201560 A1* | 6/2022 | Damnjanovic | H04W 36/04 |
| 2022/0201777 A1* | 6/2022 | Teyeb | H04L 45/302 |
| 2022/0232428 A1* | 7/2022 | Cai | H04W 40/36 |
| 2022/0304088 A1* | 9/2022 | Zhou | H04W 72/04 |
| 2022/0322204 A1* | 10/2022 | Narasimha | H04W 28/02 |
| 2022/0361072 A1* | 11/2022 | Zhu | H04L 61/5014 |
| 2022/0377615 A1 | 11/2022 | Radunovic | |
| 2023/0325266 A1 | 10/2023 | Yang | |
| 2023/0409362 A1 | 12/2023 | Shevade | |
| 2023/0409363 A1 | 12/2023 | Shevade | |
| 2024/0040002 A1 | 2/2024 | Krasilnikov et al. | |
| 2024/0073736 A1* | 2/2024 | Fujishiro | H04W 72/04 |
| 2024/0202153 A1 | 6/2024 | Huang | |
| 2024/0202157 A1 | 6/2024 | Paterra | |
| 2024/0205680 A1 | 6/2024 | Paterra | |
| 2024/0205727 A1* | 6/2024 | Belleschi | H04W 28/0236 |
| 2024/0236178 A1 | 7/2024 | Gupta et al. | |

OTHER PUBLICATIONS

U.S. Appl. No. 18/067,651, filed Dec. 16, 2022, Frank Paterra.
U.S. Appl. No. 18/067,650, filed Dec. 16, 2022, Jiandong Huang.
U.S. Appl. No. 18/066,943, filed Dec. 15, 2022, Awaiz Ahmad Khan.
U.S. Appl. No. 18/067,654, filed Dec. 16, 2022, Frank Paterra.
U.S. Appl. No. 17/809,864, filed Jun. 29, 2022, Nikolay Kirschenmann, et al.
U.S. Appl. No. 17/810,319, filed Jun. 30, 2022, Julius Mueller, at al.
U.S. Appl. No. 17/820,542, filed Aug. 17, 2022, Nikolay Kirschenmann, et al.
U.S. Appl. No. 18/630,891, filed Apr. 9, 2024, Shevade, et al.
Ashfaq Ahmed, et al., "Hybrid Automatic Repeat Request (HARQ) in Wireless Communication Systems and Standards: A Contemporary Survey", IEEE Communications Surveys & Tutorials 23.4, 2021, pp. 2711-2752.
Unknown, "5G; NG-RAN; Architecture Description", Technical Specification, ETSI TS 138 401, Version 16.8.0, Release 16, Jan. 2022, pp. 1-82.
U.S. Appl. No. 17/710,571, filed Mar. 31, 2022, Manjari Asawa.
U.S. Appl. No. 17/548,391, filed Dec. 10, 2021, Ammar Latif.
U.S. Appl. No. 17/364,791, filed Jun. 30, 2021, Diwakar Gupta.
U.S. Appl. No. 17/364,788, filed Jun. 30, 2021, Diwakar Gupta.
U.S. Appl. No. 17/364,779, filed Jun. 30, 2021, Diwakar Gupta.
U.S. Appl. No. 17/326,218, filed May 20, 2021, Ximeng Simon Yang.
U.S. Appl. No. 17/326,221, filed May 20, 2021, Ximeng Simon Yang.
U.S. Appl. No. 17/461,785, filed Aug. 30, 2021, Diwakar Gupta.
U.S. Appl. No. 17/806,684, filed Jun. 13, 2022, Benjamin Wojtowicz.
U.S. Appl. No. 17/806,685, filed Jun. 13, 2022, Benjamin Wojtowicz.
U.S. Appl. No. 17/807,343, filed Jun. 16, 2022, Upendra Bhalchandra Shevade et al.
U.S. Appl. No. 17/807,344, filed Jun. 16, 2022, Upendra Bhalchandra Shevade et al.
U.S. Appl. No. 17/807,341, filed Jun. 16, 2022, Upendra Bhalchandra Shevade et al.

* cited by examiner

Centralized units (CUs) and distributed units (DUs) of a RAN node (e.g., a gNodeB) of a radio-based application (RBA) are set up using provider network resources – e.g., a CU CU1 may be set up at a compute instance of a virtualized computing service (VCS) at a provider network data center, while DU1 and DU2 may be set up at respective compute instances on a pair of virtualization servers at edge locations such as client-premise VCS extensions, local zones etc., that are closer to the antennas/radio units of the RBA; each DU maintains buffers (e.g., at HARQ and ARQ layers) in which blocks of data being transmitted for the RBA are maintained temporarily in case the blocks have to be retransmitted 701

↓

CU1 determines that a handover, from DU1 to DU2, of network traffic associated with transmission of data between a pair of devices (e.g., a pair of user equipment devices UED1 and UED2, or a UED and a server) is to be performed 704

↓

In response to receiving an indication of the handover, DU1 transfers contents of its HARQ and ARQ buffers via a direct network channel established with DU2 (the channel may be set up either after the indication of the handover, or earlier during DU initialization, and does not include a CU as an intermediary) 707

↓

DU2 receives contents of DU1 buffers and stores them in its own buffers, using them for retransmissions if needed after the handover is complete; DU1 deletes the contents of its buffers only after they have been successfully copied to DU2, thereby avoiding the need for DU2 to populate its buffers via CU1 (which may take longer and may therefore worsen handover performance) 710

*FIG. 7*

ENABLING DIRECT CONNECTIVITY BETWEEN DISTRIBUTED UNITS OF RADIO-BASED APPLICATIONS TO IMPROVE POST-HANDOVER RETRANSMISSION PERFORMANCE

BACKGROUND

Several generations of broadband cellular communication technologies have been deployed in recent years. 5G is the fifth-generation technology standard for broadband cellular networks, which is gradually taking the place of the fourth-generation (4G) standard of Long-Term Evolution (LTE). 5G technology offers greatly increased bandwidth, thereby broadening the cellular market beyond smartphones to provide last-mile connectivity to desktops, set-top boxes, laptops, Internet of Things (IoT) devices, and so on. Some 5G cells employ frequency spectrum similar to that of 4G, while other 5G cells may employ frequency spectrum in the millimeter wave band. Cells in the millimeter wave band may have a relatively small coverage area but may offer much higher throughput than 4G. As 5G technology becomes more prevalent, new types of broadband-based applications are likely to be developed and deployed.

BRIEF DESCRIPTION OF DRAWINGS

FIG. 7 is a flow diagram illustrating aspects of operations that may be performed to enhance handover performance using direct network channels between distributed units of radio-based applications, according to at least some embodiments.

Figure 1:
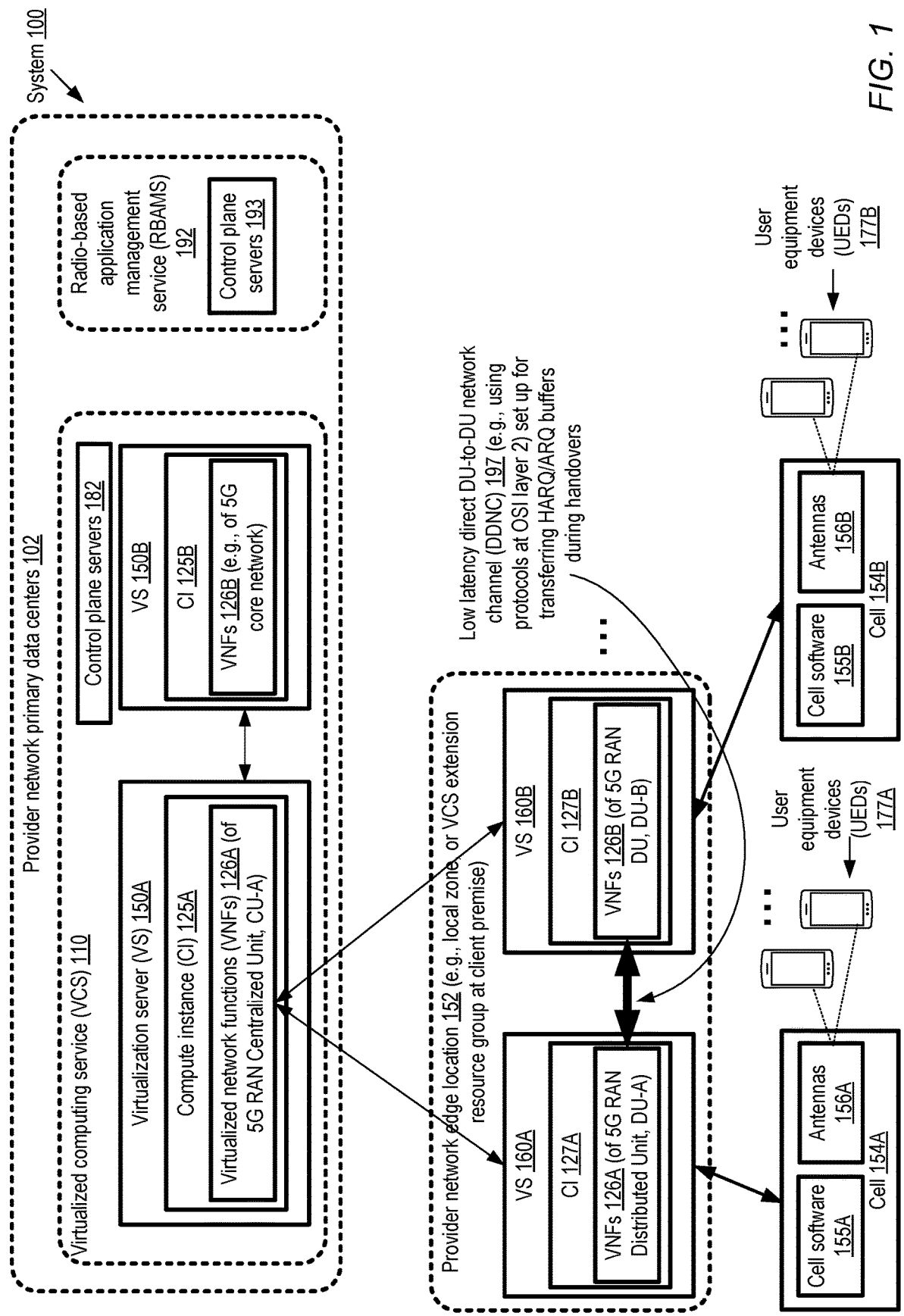
FIG. 1 illustrates an example system environment in which network connectivity may be established directly between distributed units of radio-based applications, run using resources of a virtualized computing service, to facilitate efficient retransmissions of user data after handovers, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the term "set" should generally be interpreted to include one or more described items throughout this application. Accordingly, phrases such as "a set of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

The present disclosure relates to methods and apparatus for enabling distributed units (DUs) of a radio-based application to directly transfer contents of user data buffers (which may be required for retransmissions) to each other when handovers of traffic from one DU to another are performed. If retransmission of the user data is needed, such direct transfers can speed up the total time taken to retransmit the data, as the DUs to which the buffer contents are copied do not have to obtain the data from other layers of the radio-based application, such as centralized units (CUs) or core network layers.

For some radio-based applications (RBAs) such as private 5G (fifth generation) networks, several DUs can be implemented at respective servers at the same premise or location, such as at an edge location of a provider network or cloud computing environment, while other components of the applications such as CUs can be implemented at other locations such as the primary data centers of the provider network. A CU of an RBA can decide that the network traffic associated with a data transfer between a user equipment device (UED), such as a cell phone, and another UED (or a server) is to be handed over from a particular DU (the source DU of the handover) to another DU (the target DU of the handover). The decision to perform the handover may, for example, be based on information (such as data about signal strength or signal quality, which can change when application users are moving) received from the particular UED. A DU at the sending side of the transfer (the uplink side) typically temporarily buffers user data blocks that are to be transferred, e.g., at least at the ARQ (automatic repeat request) and HARQ (hybrid ARQ) layers of the DU software stack, in the event the data has to be retransmitted to a DU or a UED at the receiving side of the transfer (the downlink side). Such retransmissions may be required for example if the data is garbled or partially lost in transit. In some conventional handover implementations, the buffers at the source DU of the handover are flushed (i.e., their contents are deleted) when an indication of the handover is received at the source DU, and the target DU of the handover has to reconstruct the data blocks (i.e., populate the HARQ and ARQ buffers of the target DU from scratch), e.g., by obtaining the data blocks via the CU and/or the core network components of the RBA.

A method of processing handovers which avoids the overhead of having to reconstruct HARQ and/or ARQ buffer contents from scratch at the target DU of the handover can be employed. In some cases, depending on the locations of the servers at which the source DU of the handover and the target DU of the handover are run, direct network pathways (e.g., pathways including local network cables, links or hops that do not require data to be transferred outside of a given premise) can be used to establish low-latency direct network channels or connections between the handover source DU and the handover target DU. Such channels can then be used to transfer contents of the buffers as part of the handover procedure from the source DU to the target DU, so that the target DU of the handover does not have to obtain the contents of the buffers via a longer, higher-latency path that includes CUs, core network components or any other RBA components. When such direct transfers are performed, the target DU can respond to retransmission requests (such as negative acknowledgements from a receiving-side UED) much more quickly that would be feasible using the conventional approach of flushing HARQ and ARQ buffers immediately upon receiving an indication that a handover is to be performed.

As one skilled in the art will appreciate in light of this disclosure, certain embodiments may be capable of achieving various advantages, including some or all of the following: (a) enabling faster user data retransmission for radio-based applications, (b) reducing the computing, memory, storage resources and electrical power used for radio-based applications, e.g., by using direct DU-to-DU communication channels instead of transferring the data blocks to a DU from another DU via intermediaries such as CUS, and/or (c) improving the user experience of end users of various radio-based communications.

According to some embodiments, a system may include a centralized unit (CU) of a fifth generation (5G) radio access network (RAN) node of a radio-based application (RBA), and a pair of distributed units (DUs) of the RAN node, comprising a first DU and a second DU. In various embodiments, the CU and the DUs may each be implemented as a collection of network functions (at least some of which may be virtualized network functions or VNFs) using some combination of hardware and software managed by a service of a cloud provider network, including for example compute instances or virtual machines run at virtualization servers (also referred to as virtualization hosts) of a virtualized computing service (VCS). The CU may be configured to determine, based on one or more criteria, that a handover, from the first DU to the second DU, of network traffic associated with a transfer or transmission of data between a first user equipment device (UED) and a second device (such as a second UED, a media server or some other network-accessible endpoint) is to be initiated.

The first DU may be configured to retain, in a first buffer for respective time intervals, respective blocks of data being transferred between the first UED and the second device via the RBA. In one embodiment, an individual block may be deleted or flushed from the first buffer by the first DU after the first DU determines that the block does not have to be retransmitted (e.g., after receiving a positive acknowledgement from a receiving-side DU of the data transfer that the contents of the block have been received at the receiving-side DU). In at least one embodiment, a block may be flushed or deleted after a timeout period expires. In some embodiments, in response to receiving an indication of the handover from the CU, the first DU may transmit at least a portion of contents of the first buffer to the second DU via a direct network channel configured between the first DU and the second DU. The direct network channel may not include the CU (or any other component of the RBA) as an intermediary in at least one embodiment.

The second DU may store, in a second buffer, the portion of contents of the first buffer received from the first DU in various embodiments. The second DU may retain contents of the second buffer until it (the second DU) has confirmed that the contents do not have to be retransmitted. After the handover is complete, the second DU may, for example, utilize the second buffer's content to respond to a negative acknowledgement or retransmission request pertaining to the transfer of data between the first UED and the second device, without requiring the content to be obtained at the second DU via the CU or any other intermediary at a different layer of the radio-based technology stack in some embodiments. The first and second buffers may be maintained at any of several sub-layers of the corresponding DUs—e.g., in some embodiments, the buffers may be maintained at a layer of the radio-based technology stack (such as a Medium Access Control or MAC layer) at which an HARQ algorithm is implemented, while in other embodiments, the buffers may be maintained at a different layer of the radio-based technology stack (such as a Radio Link Control or RLC layer) at which an ARQ algorithm is implemented. In at least some embodiments, the same direct network channel may be used to transfer contents of HARQ buffers as well as ARQ buffers from the source DU of the handover to a target DU of the handover.

In some embodiments, the direct channel may be established as part of the handover workflow—e.g., the source DU may send a channel establishment request to the target DU only after the source DU is made aware (e.g., by the CU) that the handover is imminent. In other embodiments, direct network channels may be set up between at least some pairs of DUs associated with a given CU (or even between some pairs of DUs associate with distinct CUs) as part of the initialization procedures of the DUs, so that the extra work of establishing the channels does not have to be performed in real time after a decision on a handover has been taken. In one embodiment a direct channel may be established between a pair of DUs after the DUs are initialized but before the decision to perform a handover between the pair of DUs is taken.

According to one embodiment, a DU that communicates with another DU using direct channels of the kind introduced above may be implemented at least in part at a virtualization host or server of a VCS of the provider network, with the virtualization host being located within an edge location of the provider network (such as an extension resource group or a local zone). In other embodiments, the DUs may be located within primary data centers of the provider network, rather than at edge locations. In some embodiments, CUs may be implemented at virtualization servers at the primary data centers; in other embodiments, at least some CUs may be implemented at edge locations.

In some embodiments, CUs, DUs and RUs (radio units) of an RBA may be organized in a hierarchy, with a given CU being linked to one or more DUs, and with one or more RUs being linked to a given DU. In some embodiments, direct network channels of the kind introduced above may be established between DUs that are linked to the same CU in such a hierarchy. In other embodiments, some direct DU-to-DU channels may be set up between DUs that are linked to distinct CUs. (Note that handovers between DUs that are linked to distinct CUs may be somewhat more complex than handovers between DUs that are linked to the same CU, as some form of handover between the distinct CUs may also be required in the former type of handover.) In some embodiments, the blocks of data (buffer contents) may be transferred from the source DU to the target DU via a layer-2 protocol of the Open Systems Interconnection (OSI) model, e.g., without utilizing a layer-3 protocol of the OSI model. In other embodiments, a layer-3 protocol may be used. In some embodiments, the direct channel may be disabled, de-configured, closed, terminated or disconnected after the contents of the buffer(s) are transferred for a given handover.

In at least one embodiment, at least some of the network functions of a DU may be implemented at an offloading card of a virtualization server, instead of using the primary processors (e.g., CPUs) of the virtualization server for all the network functions of the DU. In one such embodiment, the HARQ and/or ARQ buffers may be located at such an offloading card as well.

In various embodiments, DUs that communicate with each other via direct channels to transfer buffer contents as described above can be used to implement part of the functionality of a variety of radio-based or telecommunication applications (e.g., various types of broadband cellular applications such as private 5G (fifth generation) networks, IoT (Internet of Things)-based applications, public 5G applications and the like. A given DU or a CU may execute a set of network functions of a radio-based application. A network function is a functional building block within a network infrastructure, which has well-defined external interfaces and a well-defined functional behavior. Network functions can be chained together to form communications services. Network functions have historically been implemented as a physical network appliance or node; however network functions can be virtualized as well. The core and RAN (radio access network) network functions referenced herein can be based at least partly on the 3rd Generation Partnership Project (3GPP) specifications, European Telecommunications Standards Institute (ETSI) specifications, and/or other wireless communications standards in some implementations. RAN network functions are used in a radio network, typically running in cell towers and performing wireless signal to IP (Internet Protocol) conversion. Core network functions typically run in large data centers performing subscriber related business logic and routing IP traffic to the internet and back. According to the present disclosure, both core and RAN network functions can additionally or alternatively be run on a virtualization server of a cloud provider, for example an edge device provisioned to a customer to implement a private 5G network, or used by a wireless service provider or the cloud provider to create a public 5G network. The term "radio-based application" (RBA) is used herein to refer to applications in which at least some messages are transmitted using radio frequency signals and associated antennas, such as those used for various generations (4G, 5G and the like) of cellular broadband technologies. The virtualization servers used for DU or CU network functions can be referred to as RAN pipeline processing servers, RAN servers, RAN application servers, or as radio-based application servers. Note that the techniques described herein are not limited to any particular generation of cellular broadband, nor are they limited to applications that utilize any particular portion of the electromagnetic spectrum for message transmissions.

In some embodiments, a virtualization server (VS) or host being used to run DU or CU network functions may be set up as part of an extension resource group (ERG) of the cloud provider network configured at a premise external to the primary data centers of a provider network at which control plane servers of the VCS are located. An ERG may be located, for example, in the vicinity of to a set of cell towers or antennas, in response to requests from VCS clients wishing to run radio-based applications on resources managed by the VCS control plane. In other embodiments, VSs may be set up at local zones, third-party data centers or at the data centers of the provider network. A given ERG may share some administrative resources among its member servers in some embodiment, such as a local agent of the VCS control plane. In at least some embodiments, the servers used for ERGs may be configured by the provider network operator with the appropriate hardware (e.g., including network function accelerator (NFA) cards), software and firmware and then shipped to the premises where the ERGs are utilized. In some embodiments, at least some of the servers such as VSs may require relatively little physical space (e.g., some VSs supplied by the provider network operator may only take up one rack unit (1U) or a small number of rack units in a standard data center rack). In at least some embodiments, the VSs set up as part of ERGs or run at premises external to the data centers of the provider network may comprise a number of hardware, software and/or firmware elements that are especially designed to enable remotely generated virtualization-related administrative commands to be executed in a safe and secure manner, without for example requiring messages to be sent back to the sources from which the command were originally issued. In some embodiments, such elements may include trusted platform modules (TPMs) or other security modules incorporated within the offloading cards, tamper-resistant storage devices whose contents can only be decrypted as long as the storage devices are physically attached to a particular VS and so on. In at least some embodiments, such a VS may comprise a VCS control plane agent that does not make outbound calls and implements an API for inbound commands that is protected using TLS (Transport Layer Security) sessions. Such an API may have strong authorization, authentication and accounting-related controls in various embodiments. In at least some embodiments, no shared secrets associated with virtualization management may be stored within an RPS itself.

In some embodiments, a secure network channel, such as a virtual private network (VPN) tunnel or VPN connection, may be established between a VS (running at a premise external to the provider network data centers) and resources located within the provider network data centers, and such a channel may be employed for sending commands from the VCS control plane to the VS. For example, respective one way secure network channels may be used to transmit commands originally generated at the control plane servers in response to client requests (including requests to launch compute instances) for eventual execution at an VS. In one embodiment, a secure channel to be used for such commands may be set up between one or more resources at a VS (such as a VCS connectivity manager) and one or more resources within an isolated virtual network (IVN) of the client at whose request a compute instance used for a network function is to be launched at the VS. In one embodiment, the buffer contents may be transferred between the source DU and target DU of a handover using a security protocol similar to a VPN protocol.

A VS can serve as a source or destination of several different types of network traffic, including traffic between different layers of a radio-based technology stack being used for RBAs, traffic to and from other resources within the provider network, traffic to and from resources in client networks established at client premises, traffic to and from the public Internet, and so on. A given VS can be equipped with several different kinds of networking hardware devices (NHDs) that can be employed for the network traffic, including for example default network interface cards, networking chipsets within network function accelerators (NFAs), networking chipsets within virtualization management offloading cards, and so on. Any combination of one or more of the NHDs may be used for the direct DU-to-DU channels mentioned above in different embodiments. Network management logic provided by the provider network can be used to intelligently select the most appropriate NHD to be used for a given category of traffic of a VS during a given time interval, thus enabling the best use of the available networking resources of the VS to achieve quality of service targets of the applications being run at the VS. For example, depending on the types of RBAs being run, a different NHD can be used for front-haul traffic of the radio-based applications than is used for mid-haul traffic for at least some time periods. Software programs (e.g., programs developed by third-party vendors or by the provider network operator) which implement part of an RBA can be run within runtime environments (RTEs) such as radio-optimized compute instances or radio-optimized software containers at a VS. In some embodiments, a given VS or a given NFA may be employed for several different RBAs or pipelines, e.g., on behalf of a single client of the provider network or on behalf of different clients. As a result of such multi-tenancy, the overall amount of computing resources and/or power consumed for implementation of several different RBAs can be reduced substantially. The reduction in the resources used, which can translate into lower costs, in turn enables new entrants into the radio-based application space, and the design of new types of applications.

According to some embodiments, a provider network may comprise a radio-based application management service (RBAMS) which implements programmatic interfaces pertaining to the configuration of RBA network functions. An indication of an expected geographical distribution of end-user requests (e.g., cell phone calls, text messages, IoT sensor inbound and outbound messages, etc.) of a radio-based application may be obtained at the RBAMS via such programmatic interfaces. The information about the geographical distribution may be used at the RBAMS to select or recommend one or more premises at which ERGs and/or VSs of one or more categories supported by the provider network should be configured for the client. If the client indicates an approval of the recommendations, one or more VSs may be configured on behalf of the client at such premises and assigned to the clients' applications by the RBMAS in such embodiments. The premises may include, for example, a point-of-presence site of the provider network, a local zone premise of the provider network, or a client-owned premise.

In at least some embodiments, a variety of metrics may be collected (e.g., by control plane servers of a VCS or the RBAMS) from the DUs and CUs of RBAs and provided to clients via programmatic interfaces if desired; such metrics may include inbound or outbound message transfer counts or message transfer rates, times taken to complete handovers between DUs, times taken to transfer buffer contents between DUs for handovers, failure rates of NFAs, utilization levels of the local processors, memory and other resources of the NFAs, and so on in different embodiments.

As mentioned above, CUs and DUs of an RBA may be executed at least in part using resources of a provider network in some embodiments. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network or as a VCS extension resource group. Some outposts may be integrated into communications networks, for example as a multi-edge cloud having physical infrastructure spread across telecommunication data centers, telecommunication aggregation sites, and/or telecommunication base stations within the telecommunication network. In the on-premise example, the limited capacity of the outpost may be available for use only be the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

As mentioned above, some cloud provider networks may provide support for local zones, a type of infrastructure deployment that places some of the provider network's compute, storage, database, and other select services close to large population, industry, and IT centers or other desired locations which may not be very near the provider network's primary data centers. With such local zones, applications that need single-digit millisecond latency (such as DUs or other components or RBAs) can be run closer to end-users in a specific geography. Local zones provide a high-bandwidth, secure connection between local workloads and those running in a provider network region, allowing provider network clients to seamlessly connect to their other workloads running in the region and to the full range of in-region services through the same APIs and tool sets.

The cloud provider network may implement various computing resources or services, which may include a virtual computing service (VCS), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers of the provider network in different embodiments. Network-accessible computing services can include an elastic compute cloud service (referred to in various implementations as an elastic compute service, a virtual machines service, a computing cloud service, a compute engine, a virtualized computing service (VCS) or a cloud compute service). This service may offer virtual compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of central processing units [CPUs] or CPU cores, NFAs or other accelerators), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, a non-burstable or dedicated instance type that is allotted and guaranteed a fixed quantity of resources, or an instance type optimized for radio-based applications). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on.

The computing services of a provider network can also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. A container engine can run on a virtual machine instance in some implementations, with the virtual machine instance selected based at least partly on the described network performance metrics. RBA components, including DU and CU network functions, may be run using containers in at least some embodiments. Other types of network-accessible services, such as packet processing services, database services, wide area networking (WAN) services and the like may also be implemented at the cloud provider network in some embodiments.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information management). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which network connectivity may be established directly between distributed units of radio-based applications, run using resources of a virtualized computing service, to facilitate efficient retransmissions of user data after handovers, according to at least some embodiments. In system 100, resources managed by a virtualized computing service (VCS) 110 may be distributed among provider network primary data centers 102 and provider network edge locations 152 such as VCS extension resource groups at client premises, or local zones established by the provider network operator at premises external to the primary data centers. VCS control plane servers 182, responsible for administrative tasks associated with compute instances of the VCS (such as launching compute instances, provisioning virtualization servers, etc.), may be located within the primary data centers. The provider network may also implement a radio-based application management service (RBAMS) 192 in the depicted embodiment, with control plane servers 193 responsible for example for obtaining executable or source code versions of virtualized network functions to be used for various layers of the RBAs, and deploying them at virtualization servers.

In the scenario depicted in FIG. 1, virtualization server (VS) 150A and VS 150B at a primary data center may comprise a compute instance (CI) 125A and CI 125B respectively. CI 125A may be used to run one or more virtualized network functions (VNFs) 126A of an RBA, such as VNFs of a 5G RAN CU, CU-A. CI 125B may be used to run additional VNFs 126B, e.g., at the core network layer of the RBA. VSs 160A and 160B located at edge location 152 may include CI 127A and CI 127B respectively. VS 160A and VS 160B may be used to run additional VNFs of the RBA, such as VNFs 126A and VNFs 126B. VNFs 126A may implement at least a portion of one DU (DU-A) of the 5G RAN of the RBA, while VNFs 126B may implement at least a portion of a second DU (DU-B) of the same 5G RAN in the depicted embodiment. Traffic of the RBA, associated with user equipment devices (UEDs) 177A (such as cell phones, IoT devices and the like) may flow between a cell 154A of the RBA, and VNFs 126A in the depicted embodiment. Cell 154A may comprise antennas 156A and cell software 155A, implementing at least a portion of a radio unit (RU) of the RBA. Similarly, other traffic of the RBA, associated with UEDs 177B, may flow between another cell 154B of the RBA, and VNFs 126B in the depicted embodiment. Cell 154B may comprise antennas 156B and cell software 155B, implemented another RU of the RBA.

At least some UEDs 177A may be moved from place to place, such as cell phones being carried by individual end users of the RBA. Due to such motion or other reasons, it may sometimes be the case that the strength or quality of the radio signals that can be used for transferring the data to/from one or more UEDs changes over time, resulting in the need for a handover of the processing of network traffic of the data transfer from one DU DU-A (running at least in part at VS 160A) to a second DU DU-B (running at least in part at VS 160B). The decision to initiate the handover may be made, for example, at CU-A of the RBA, running at VS 150A, based at least in part on information about the signal strength and quality conveyed from a UED 177A to CU-A via a DU-A running at CI 127A.

As part of DU-A's Medium Access Control (MAC) layer and/or Radio Link Control (RLC) layer logic, respective blocks of data being transmitted from a UED 177A to a destination such as some other UED (e.g., a UED connected to a cell not shown in FIG. 1) via the RBA may be retained temporarily in one or more buffers in the depicted embodiment. A given block of data may be retained in a buffer referred to as an HARQ (Hybrid Automatic Repeat Request) buffer in the MAC layer, and/or at an ARQ (Automatic Repeat Request) buffer in the RLC layer in various embodiments. HARQ and ARQ algorithms for transferring and re-transmitting data upon request may be implemented at both the sending side or uplink DU of the data transfer (e.g., DU-A) and at the receiving side or downlink DU of the data transfer (the receiving side DU is not shown in FIG. 1), as well as at a receiving-side UED or server. A sending side DU may retain a data block in an HARQ or ARQ buffer until it receives an indication that the block has been successfully received (i.e., that an error-free version of the data block has been obtained) at the receiving side DU or UED, or until some other criterion (such as expiration of a timeout associated with the transfer of which the data block is a part) has been met. After an acknowledgement message indicating that the block has been received successfully and therefore will not need to be retransmitted is received, in various embodiments the sending-side DU such as DU-A may delete the block from its buffer or buffers.

CU-A may notify DU-A regarding the handover, e.g., by sending one or more messages according to a handover protocol to DU-A in the depicted embodiment. In response to receiving an indication of the handover from CU-A, DU-A may transmit or transfer contents of the buffers at the HARQ and/or the ARQ layer to DU-B via a low-latency direct DU-to-DU network channel (DDNC) 197 in various embodiments. As implied by the use of the word "direct" its name, the DDNC may not include CU-A or any other components of the RBA as intermediaries. In at least some implementations, one or more physical cables and/or one or more local hardware network components of the edge location 152 may be used to implement the DDNC. In at least some embodiments, a layer-2 protocol of the OSI model may be used to transfer the buffer contents from DU-A to DU-B, e.g., without using a layer-3 protocol of the OSI model. In some embodiments, the DDNC 197 may be established or configured after the decision to initiate the handover is made; in other embodiments, at least some DDNCs between pairs of DUs may be established as part of the initialization procedure of the DUs, or at some other point prior to the handover decision.

DU-B may store the received contents in its own buffers at the HARQ and/or the ARQ layer. The handover protocol may not be considered complete in some embodiments until DU-A has received an acknowledgement from DU-B that the contents of the buffers have been received at DU-B. After the handover protocol or procedure is completed, DU-B may take over the responsibility of handling retransmission requests from a receiving-side DU or UED of the data transfer which was handed over. For example, a portion of the buffer contents sent earlier by DU-A may be utilized by DU-B in response to a retransmission request pertaining to the data transfer between a pair of UEDs, without requiring or obtaining the contents by DU-B from CU-A.

In some embodiments, one or more of the DU-A or DU-B network functions may be executed at an offloading card of the corresponding VS, e.g., at a hardware network function accelerator (NFA) incorporated within an offloading card connected to the primary processors (e.g., CPUs) of the VS via a peripheral interface. Such an NFA may be used, for example, to run VNF logic more efficiently and quickly than if the logic were implemented at the primary processors, and may also help to free up more of the computing capacity of the primary processors for other VNFs or other applications. In at least one embodiment in which an offloading card with an NFA is employed, the buffers whose contents are transferred via a DDNC 197 may be incorporated within the accelerator card. In general, network functions at any of the layers (such as CUs, DUs or core network) of an RBA may be run at any desired or premise of the provider network—e.g., at the primary data centers 102, or at edge locations comprising VCS extension groups or outposts in various embodiments. For example, two DUs (including DUs that are linked via direct DU-to-DU channels) or two CUs of a given RBA may be run at the same premise, or at different premises using virtualization servers. At least some core network functions may be run at VCS extension groups as well in some embodiments, e.g., either at the same premise as a corresponding CU or DU or at a different premise.

Figure 2:
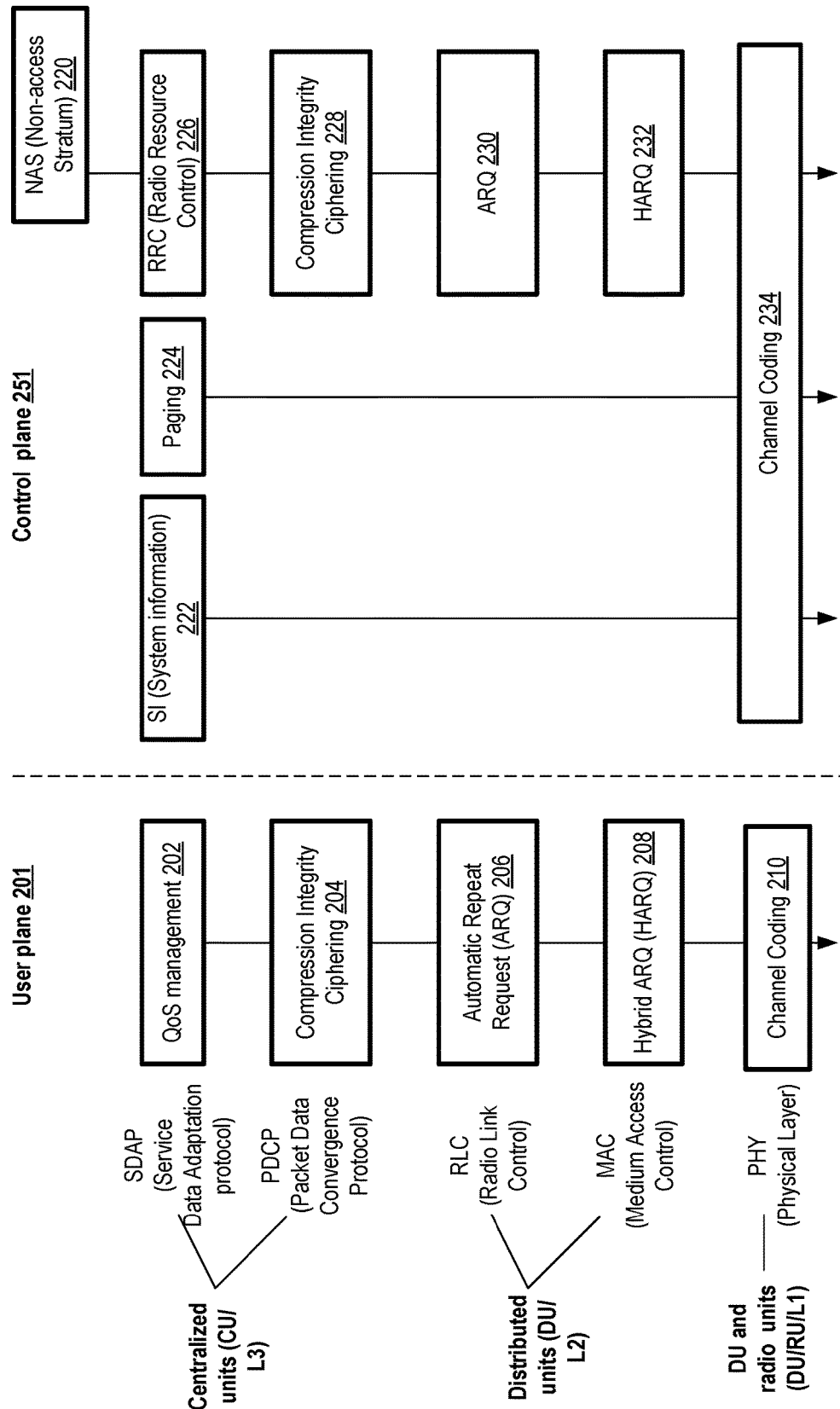
FIG. 2 illustrates an overview of user plane and control plane layers defined in accordance with a radio-based application technology standard, according to at least some embodiments.

FIG. 2 illustrates an overview of user plane and control plane layers defined in accordance with a radio-based application technology standard, according to at least some embodiments. The arrows shown in FIG. 2 represent the downlink communication path (from the higher levels of the standard, often implemented at back-end servers, downwards to the lower levels which are implemented using front-end components such as radio antennas and network function accelerators of the kind described above). The depicted layers conform to a 5G-NR (Fifth Generation-New Radio) standard published by 3GPP (Third Generation Partnership Project), a group of organizations responsible for defining protocols for mobile communications; similar layers are also defined for other generations of cellular communication technology.

In a manner somewhat analogous to the subdivision, discussed above, of a provider network functionality into control plane and data plane functionality, the operations needed for radio-based applications are divided into control plane operations and user plane operations. Control plane operations include connection configuration and other administrative tasks such as monitoring, while user plane operations involve transmission of user data using Internet Protocol (IP) packets.

The 5G-NR protocol stack comprises three layers, referred to as L1 (layer 1), L2 (layer 2) and L3 (layer 3). Standardized interfaces for communications between the layers (and between sub-layers of individual layers) have been defined; this allows network functions of the layers and sub-layers to be mapped flexibly to different hardware and/or software components as long as the interfaces and performance requirements of the protocol stack can be met. Logic for executing the functionality of the layers is distributed among three types of components: centralized units (CUs) for L3 operations, distributed units (DUs) used for L2 operations and optionally for some L1 operations, and radio units (RUS) used for at least a subset of L1 operations. L1 is also referred to as the physical layer (PHY). L2 comprises the MAC (Medium Access Control) and RLC (Radio Link Control) sub-layers. L3 may include sub-layers for PDCP (Packet Data Convergence Protocol) and SDAP (Service Data Adaptation Protocol). Operations of user plane 201 may include quality of service (QOS) Management 202 and Compression Integrity Ciphering 204 in L3, Automatic Repeat Request (ARQ) processing 206 and Hybrid ARQ (HARQ) processing 208 in L2, and Channel Coding 210 at the PHY layer. Contents of buffers used for ARQ and/or HARQ protocols may be transferred among pairs of DUs via direct DU-to-DU channels of the kind introduced above in some embodiments. Operations of control plane 251 may include Non-access Stratum (NAS) 220 protocol tasks, System Information (SI) 222 tasks, Paging 224, Radio Resource Control (RRC) 226 and Compression Integrity Ciphering 228 in L3, ARQ 230 and HARQ 232 in L2, and Channel Coding 234 in the PHY layer. At least some of the layers and protocols shown in FIG. 2 may comprise the execution of respective sets of network functions. In at least some embodiments, a subset of the network functions corresponding to L1, L2 and/or L3 may be implemented using virtualization servers (e.g., servers including network function accelerators).

Figure 3:
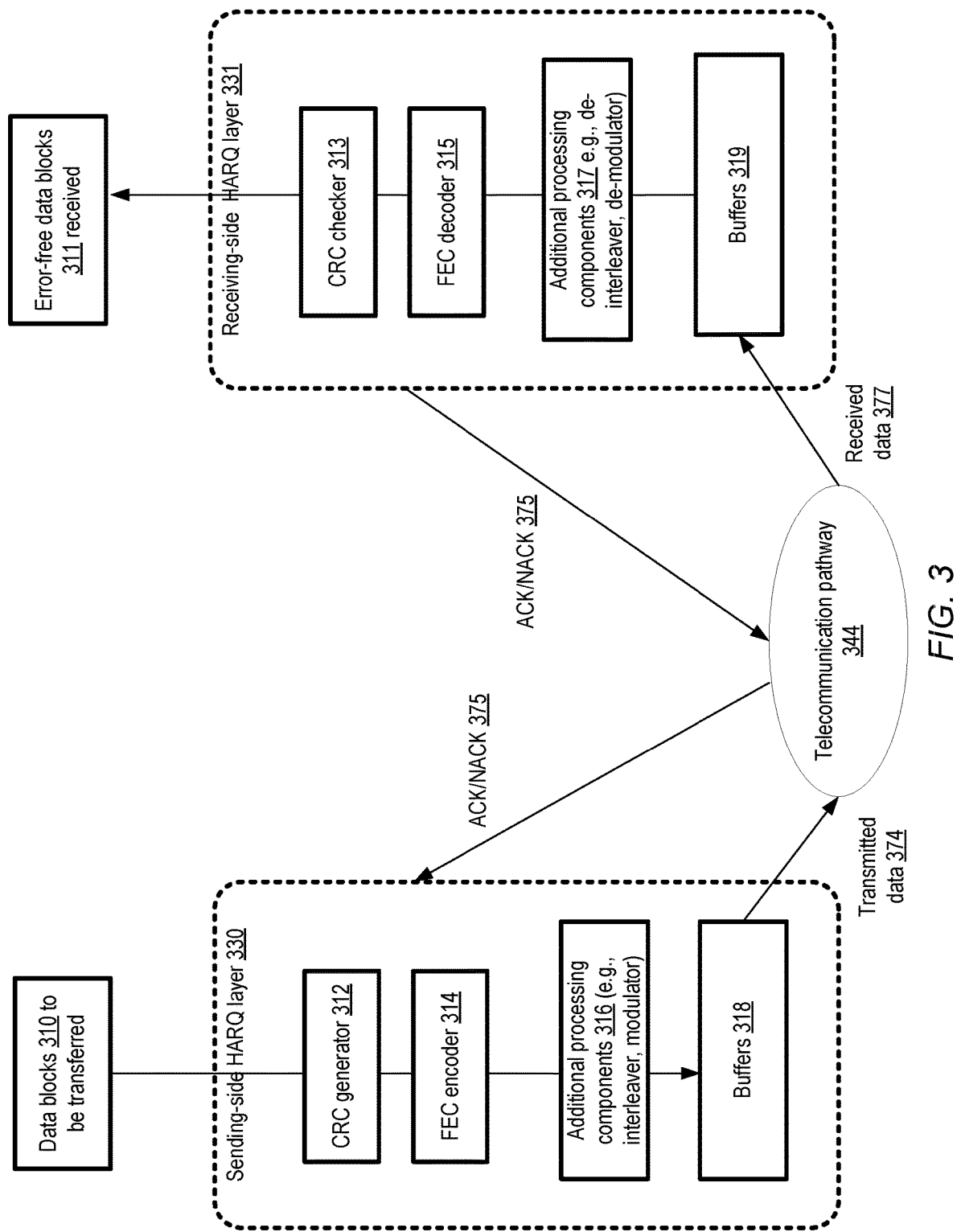
FIG. 3 illustrates example aspects of hybrid automatic repeat request (HARQ) operations at radio-based applications, according to at least some embodiments.

FIG. 3 illustrates example aspects of hybrid automatic repeat request (HARQ) operations of radio-based applications, according to at least some embodiments. Note that FIG. 3 illustrates logical components of the HARQ layers at the sending-side and the receiving-side of a data transfer between a pair of user equipment devices to illustrate the concepts involved, and does not necessarily represent the manner in which the HARQ layers may be implemented or organized in a given embodiment. The HARQ logic illustrated in FIG. 3 may for example be implemented at a DU at the sending side and at a user equipment device (UED) at the receiving side.

In the scenario shown in FIG. 3, a set of data blocks 310, each comprising some number of bits, is to be transferred from a sending-side user equipment device to a receiving-side user equipment device via a radio-based application (RBA) that utilizes a telecommunication pathway 344. The telecommunication pathway may for example include links of the public Internet and/or private network links, depending on the destination to which the data blocks are sent and the type of application being executed. The sending-side HARQ layer 330 may include a CRC (cyclic redundancy code) generator 312, an FEC (forward error correction) encoder 314, additional processing components 316 (such as an interleaver and a modulator) as well as a set of buffers 318 in the depicted embodiment. The receiving-side HARQ layer 331 comprises its own buffers 319, additional processing components 317 (such as a de-interleaver and a demodulator) which in effect perform the inverse operations of the operations performed at additional processing components 316, an FEC decoder 315 and a CRC checker 313.

A copy of a transmitted data 374 that is sent via the telecommunication pathway 344 may be retained temporarily in the buffers 318 at the sending-side in the depicted embodiment, until a positive acknowledgement (ACK) is received from the receiving-side. The positive or negative acknowledgement ACK/NACK message 375 corresponding to a given received data block may be generated at, for example, the CRC checker 313 or the FEC decoder 315 in response to analysis of a block of received data 377 and sent back to the sending-side via the telecommunication pathway. The analysis may be performed to determine whether the received data block is error-free (or if it contains errors, whether the errors can be corrected at the receiving-side or not). If a NACK is received at the sending-side for a given data block, this may trigger the transmission of additional messages pertaining to that data block from the sending-side to the receiving-side. These additional messages may be considered retransmissions pertaining to the given data block, and the NACK may be considered a retransmission request. Depending on the specific HARQ protocol being used, the additional messages may contain at least a portion of the original data block itself, a transformed version of at least a portion of the data block, additional error-correction or error-detection bits which are computed from the original data block, and so on. If a transformed version of the data block is sent, or additional error-correction or error-detection bits are sent, they may be utilized in various types of computations at the receiving-side in an attempt to determine or obtain an error-free version of the data block. The receiving-side may retain the received data blocks (and/or the additional information sent in retransmission messages) in its buffers 319 until eventually an error-free data block 311 is obtained or computed at the receiving side and a positive ACK can be sent to the sending-side.

In some conventional DU implementations, the contents of the buffers 318 pertaining to a given transmission of data between a pair of user equipment devices may be flushed in response to a determination at the sending-side DU that a handover of network traffic for that transmission of data is to be performed to another sending-side DU (the target DU of the handover). This means that the target sending-side DU to which the handover is performed may have to reconstruct or repopulate the data in its buffers, e.g., by communication with higher layers of the RBA such as the CU or core network components. Such reconstruction of the buffer contents can lead to delays in retransmissions (if retransmissions are needed) from the new sending-side DU (the target of the handover) to the receiving-side DU. In contrast, if the contents of the buffers are copied via direct DU-to-DU channels or connections at the sending side using the techniques introduced above, such delays can be avoided in various embodiments. In some embodiments, similar direct DU-to-DU channels may be set up at the receiving-side as well for copying of buffers if/when handovers are initiated between receiving-side DUs. Although buffering is shown at the HARQ layer in FIG. 3, conceptually similar buffering may be implemented at the ARQ layer as well in some embodiments, and similar benefits may be achieved by transferring/copying contents of ARQ buffers for handovers.

Figure 4:
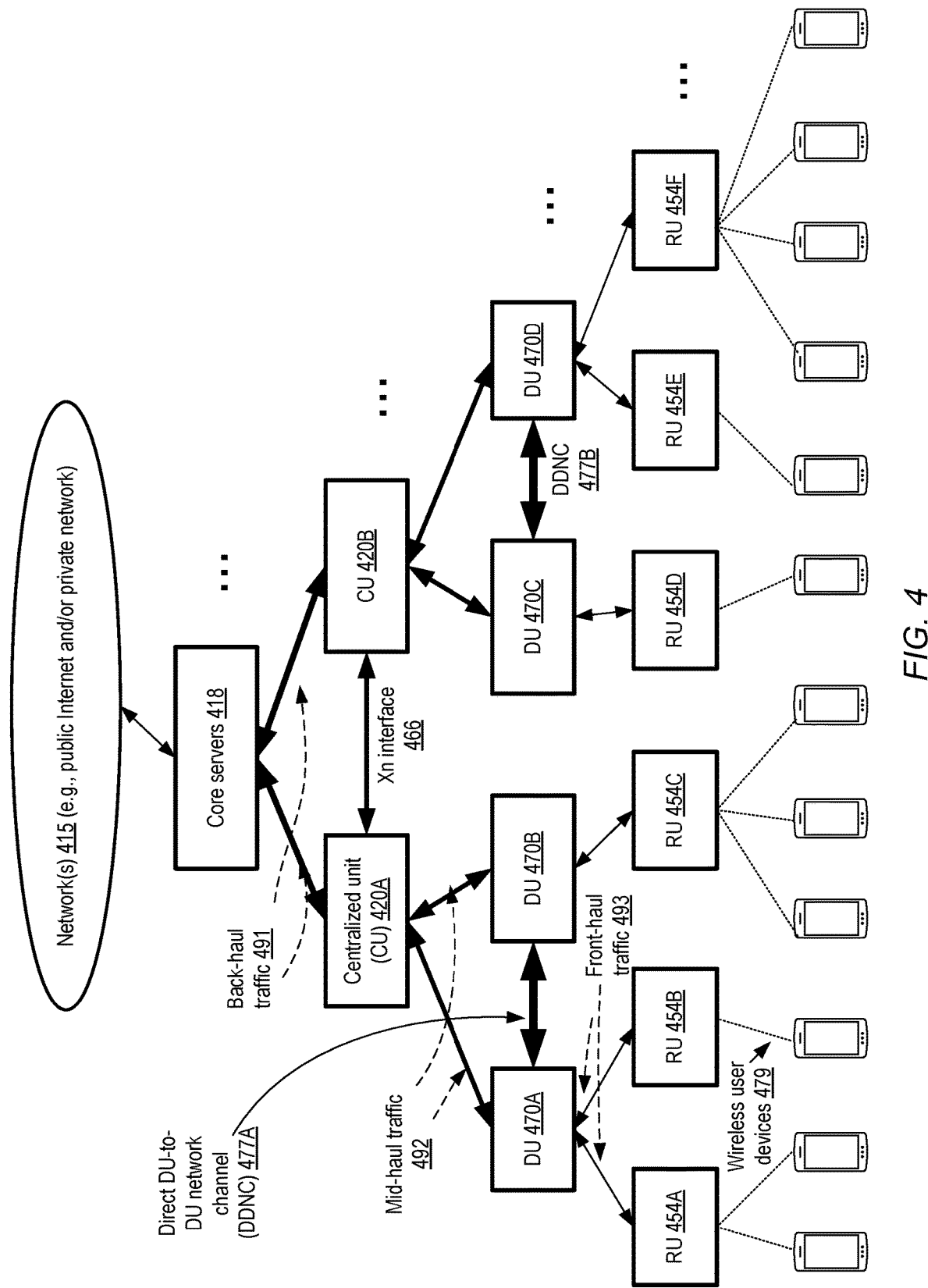
FIG. 4 illustrates example network channels which may be set up between different distributed units in a hierarchy of components of a radio-based application, according to at least some embodiments.

FIG. 4 illustrates example network channels which may be set up between different distributed units in a hierarchy of components of a radio-based application, according to at least some embodiments. In the depicted embodiment, core servers 418, linked to one or more networks 415 used to transfer the Internet Protocol packets comprising the payloads and control signals of radio-based applications over large distances, may implement a set of back-end functions associated with radio-based applications, enabling different sub-networks of the overall system to communicate with one another. Network functions performed at the core servers (referred to as core network functions) may for example include functions to aggregate data traffic from end user devices, authenticate subscribers, apply personalized policies, and/or manage the mobility of devices prior to routing traffic to operator services or the Internet. A given core server 418 may, for example, be implemented using resources (such as a virtualization server) at a provider network data center in one embodiment. The core server may be connected to one or more centralized units (CUs), such as CU 420A and CU 420B. The traffic between the core servers 418 and the CUs 420 may be referred to as back-haul traffic 491 of the RBA. A virtualization server at which a CU is implemented may, for example, be located within a premise at which one or more VCS extension resource groups are located, at a premise which is located close to such extension premises, or at a primary data center of the provider network.

In the embodiment depicted in FIG. 4, a given CU 420 may be linked to (and manager various tasks associated with) one or more distributed units (DUs) 470 of the RBA. For example, CU 420A may be connected to DU 470A and DU 470B, while CU 420B may be linked to DU 470C and DU 470D. The traffic between CUs and DUs may be referred to as mid-haul traffic 492 in various embodiments. Each of the DUs in turn may be linked with radio units (RUs) 454 associated with one or more cells of a cellular network in the depicted embodiment. For example, DU 470A may be linked to RUs 454A and 454B, DU 470B may be linked to RU 454C. DU 470C may be linked to RU 454D, and DU 470D may be linked to RUs 454E and 454F. The traffic between DUs and RUs may be referred to as front-haul traffic 493. Each of the RUs maybe associated with one or more antennas which can be used to receive and transmit radio frequency signals from a variety of wireless user devices 479. In some embodiments, DUs, CUs and core networks may all be implemented at least in part using provider network resources. In one embodiment, at least some of the functionality of the RUs 454 may also be implemented using provider network resources. A given RAN node such as a gNodeB may comprise at least one CU, at least one DU and at least one RU in some embodiments. A RAN of a radio-based application may comprise one or more RAN nodes in various embodiments. Different generations of radio-based technologies (such as fourth-generation or 4G, 5G, etc.) can comprise respective implementations of RANs and RAN nodes, sometimes with different names for the RAN nodes—for example, a 4G/LTE (Long Term Evolution) RAN node can be referred to as an eNodeB.

An Xn interface 466 (defined by ETSI in its standards documents) may be utilized for direct communication between CUs such as CU 420A and 420B in some embodiments. In various embodiments a direct DU-to-DU network channel (DDNC) 477, such as DDNC 477A or DDNC 477B, may be established and utilized for transferring contents of HARQ and/or ARQ buffers in response to a determination that a handover of network traffic associated with a particular set of user-equipment devices is to be performed. In at least some embodiments, a DDNC may be established between a pair of DUs that are linked to the same CU, while DDNCs may not necessarily be established between pairs of DUs that are not linked to the same CU. For example, in the scenario shown in FIG. 4, DDNC 477A is set up between DU 470A and DU 470B, which are linked to the same CU 420A, while DDNC 477B is set up between DU 470C and DU 470D, which are linked to CU 420B. In many cases, DUs that are linked to the same CU may be implemented at servers that are physically located very close to one another, such as at virtualization servers set up at a given client-owned premise, so the latency of message transfers (e.g., messages containing HARQ/ARQ buffer contents) between the DUs may be very low, which is beneficial for implementing handovers. In some embodiments, a given transfer may utilize multiple parallel DU processes at the HARQ and/or ARQ layers working in parallel, and respective buffers (with associated DU-to-DU transfers of buffer contents for handovers) may be used for each of the parallel DU processes. In one such embodiment, multiple DDNCs may be set up, one for each DU process; in other embodiments, a given DDNC may be shared among multiple processes.

In some embodiments, depending for example on the message latencies achievable for transfers between DUs that are not linked to the same CU, DDNCs may also or instead be set up between DUs that are linked to different CUs. For example, a DDNC may be set up in such an embodiment between DU 470B (which is linked to CU 420A) and DU 470C (which is linked to CU 420B). In at least some embodiments, estimated or actual performance data pertaining to potential direct channels between pairs of DUs may be provided to or collected by CUs, and such data may be used to determine whether establishing a DDNC between a given pair of DUs would be worthwhile or not. For example, consider an example scenario in which it is estimated that on average it would take N milliseconds for a given handover target DU to obtain contents of a buffer from a CU or a core server, and it is estimated that it would take M milliseconds for a DU to obtain a copy of a buffer from a handover source DU via a direct network channel. In such a scenario, if (M/N) is less than a threshold value, a decision to establish a DDNC may be made by a CU, while if (M/N) is greater than the threshold, a decision not to establish a DDNC may be made.

Figure 5:
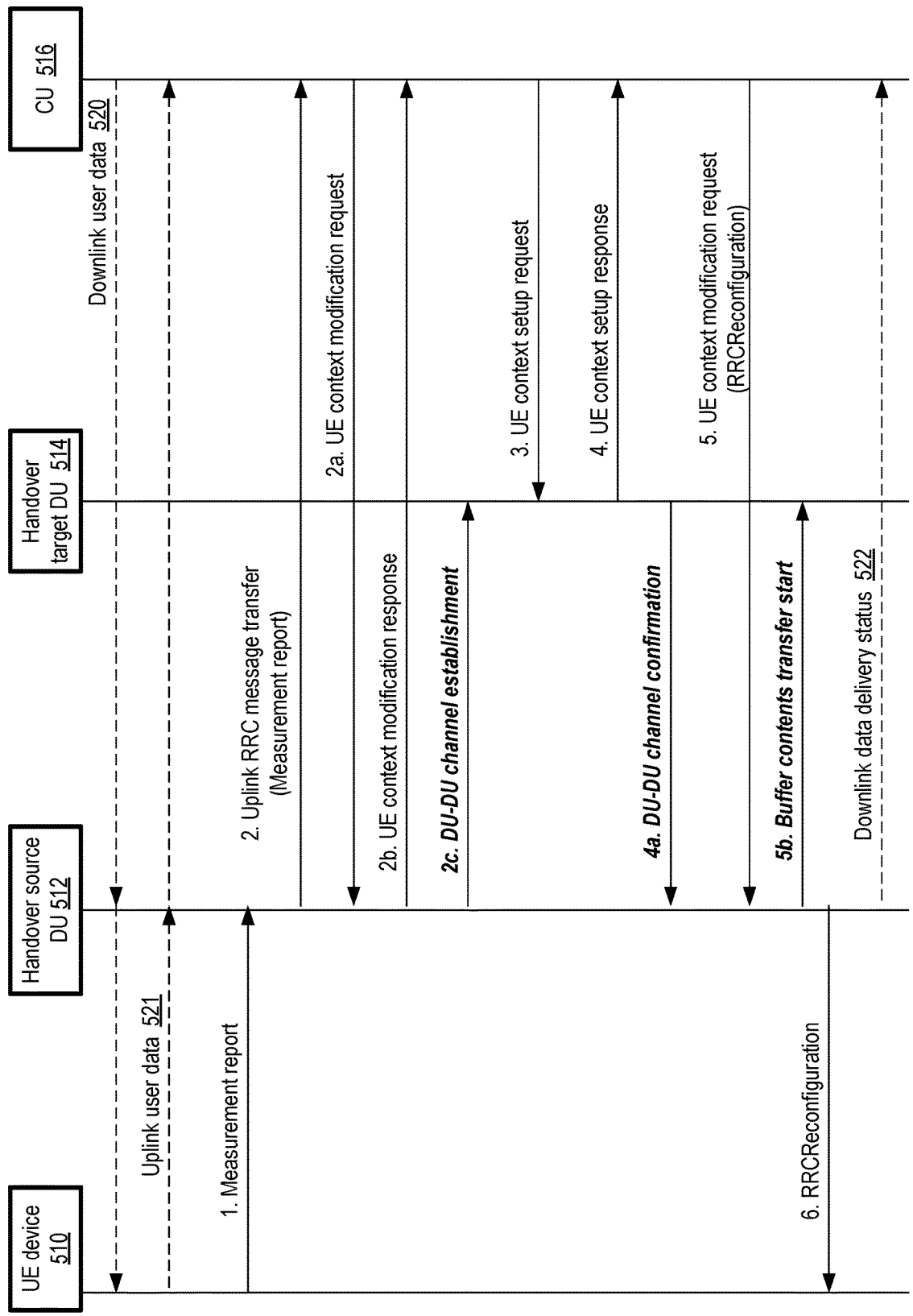
FIG. 5 and FIG. 6 collectively illustrates example handover-related interactions between centralized units, distributed units and user equipment devices, according to at least some embodiments.
Figure 6:
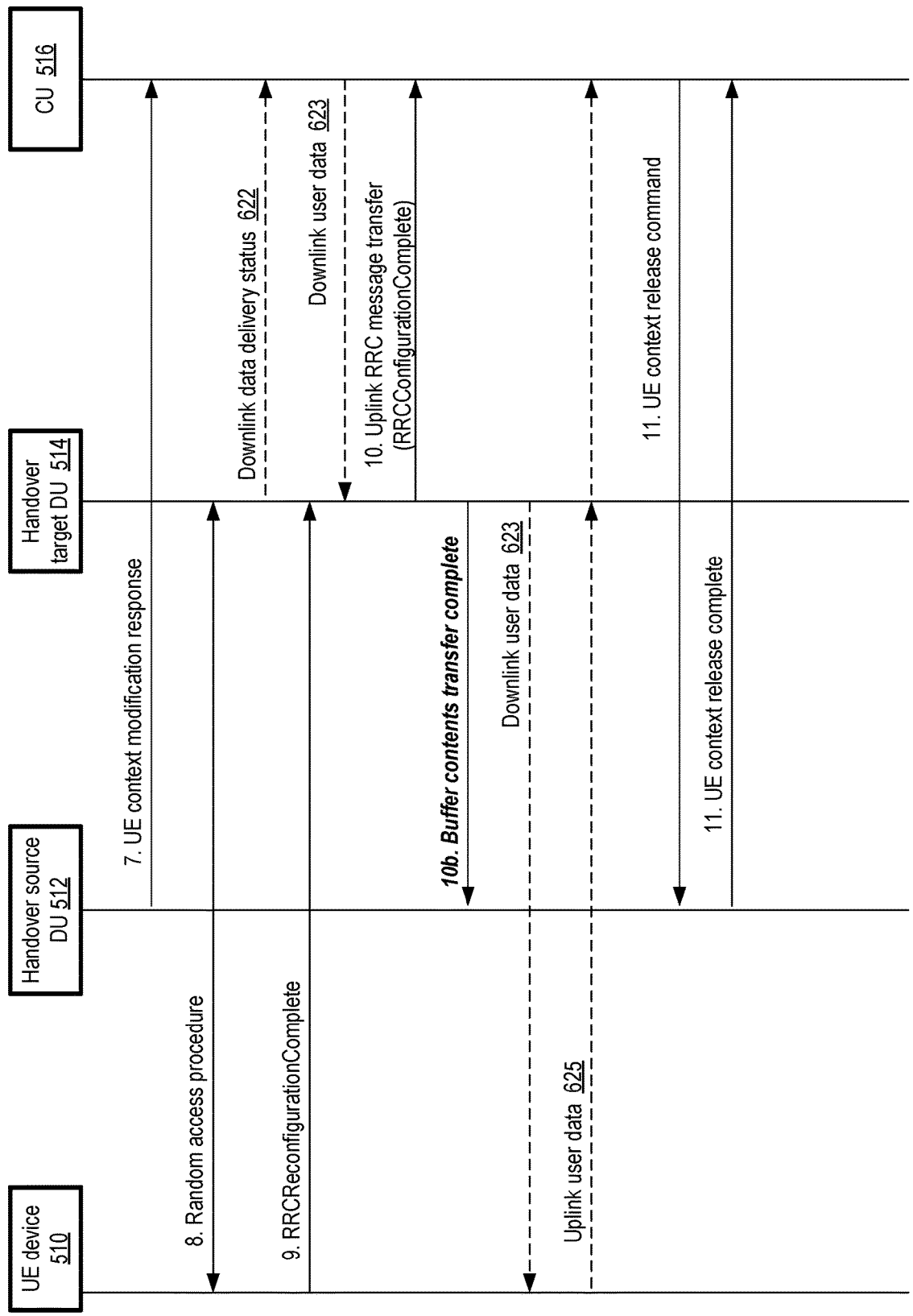

FIG. 5 and FIG. 6 collectively illustrates example handover-related interactions between centralized units, distributed units and user equipment devices, according to at least some embodiments. Several of the interactions shown in FIG. 5 and FIG. 6 (other than the interactions associated with direct DU-to-DU connectivity, which are shone in bold and italics) are based on handover specifications provided in ETSI Technical Specification (TS) 138 401 V16.8.0 (2022-01).

In the scenario depicted in FIG. 5 and FIG. 6, network traffic comprising user data originating at and/or directed to a user equipment (UE) device 510 is initially being handled by a handover source DU 512 of a radio-based application. The handover source DU is linked to a CU 516 of the radio-based application. Downlink user data 520 is transmitted, prior to the handover, from CU 516 to handover source DU, and then transmitted further from the handover source DU 512 to the UE device 510 (e.g., via an RU which is not shown in FIG. 5). Similarly, uplink user data 521 is sent (via an RU) from the UE device 510 to the handover source DU 512, and forwarded from the handover source DU 512 to the CU 516.

In accordance with the ETSI standard, a message (indicated via the arrow label "1. Measurement report" in FIG. 5) comprising, for example, information about the current strength or quality of the signal being received at the UE device may be sent from the UE device to the handover source DU 512. As indicated by the arrow labeled "2. Uplink RRC message transfer (Measurement report)", the information provided in the report may be transmitted from the handover source DU to the CU 516. Based on analysis of the report and/or based on other factors, the CU 516 may make a decision that a handover of traffic associated with UE device 510 is to be performed. The CU may choose the handover target DU 514 (e.g., also based on data in the report, and/or other factors) as the new DU to be used for the UE device's traffic.

The CU 516 may send a UE context modification request message (the arrow labeled 2a in FIG. 5) to the handover source DU. In various embodiments, the context modification request message 2a may include a configuration query directed to the handover source DU. An indication of the handover may be provided to the handover source DU 512 in the context modification request 2a in one embodiment. In at least some embodiments, the context modification request message 2a may include identification information (e.g., a unique identifier or name, a network identifier or address at a selected layer of the OSI model, etc.) of the proposed handover target DU 514 enabling the handover source DU to establish direct connectivity with the handover target DU. The handover source DU may send a context modification response (the arrow labeled 2b) acknowledging receipt of the message indicating the handover, and providing configuration information if such configuration information was requested by the CU, in various embodiments.

In the embodiment depicted in FIG. 5, the handover source DU 512 may then send a message 2c to the handover target DU 514 establish a direct DU-to-DU network channel (DDNC) of the kind described earlier. The CU may send a UE context setup request (the arrow labeled 3) to the handover target DU 514, requesting the handover target DU to create a UE context and set up one or more data bearers.

The UE context setup request may include information about the handover in the form of a HandoverPreparationInformation message in some embodiments, as well as other configuration information pertaining to the handover. The UE context setup request may include an identifier of the handover source DU in some embodiments. The target DU 514 may send a UE context setup response message (the arrow labeled 4) to the CU in response to the UE context setup request. In at least some embodiments, a DU-to-DU channel confirmation message (labeled 4*a*) may be sent from the handover target DU to the handover source DU in the depicted embodiment, indicating to the handover source DU that connectivity has been established between the two DUs and that contents of the HARQ/ARQ buffers may be sent.

The CU 516 may send another UE context modification request message (the arrow labeled 5) to the handover source DU 512 at this stage of the handover workflow or procedure in the depicted embodiment. This message may include an RRCReconfiguration message indicating that the handover source DU is to stop data transmission for the UE device 510. In at least some embodiments, the handover source DU 512 may start the transfer of contents of buffers at the HARQ and/or the ARQ layer to the handover target DU 514, as indicated by the arrow labeled 5*b*. The RRCReconfiguration message received from the CU may be forwarded by the handover source DU to the UE device 510 in various embodiments. A Downlink data delivery status message 522 may be sent from the handover source DU 512 to the CU 516, e.g., to inform the CU about unsuccessfully transmitted downlink data to the UE device.

As shown in FIG. 6, the handover source DU 512 may send another UE context modification response (the arrow labeled 7) to the CU 516 in response to the UE context modification request corresponding to the arrow labeled 5 in FIG. 5. As indicated by the arrow labeled 8, a random access procedure may be initiated by the UE device and/or the handover target DU, enabling the UE to connect with the appropriate cell, RU and/or the handover target DU. The handover target DU may send a downlink data delivery status message 622 to the CU, which may result in the transmission of downlink user data 623 that has not yet been successfully transmitted to the UE device to be sent from the CU to the handover target DU in some embodiments. The UE device may send an RRCReconfigurationComplete message (the arrow labeled 9) to the handover target DU in the depicted embodiment, and the handover target DU may send an uplink RRC message transfer (the arrow labeled 10) comprising the RRCReconfigurationComplete message to the CU.

In the embodiment shown in FIG. 6, the handover target DU 514 may send a message (the arrow labeled 10*b*) to the handover source DU, indicating that the buffer contents transfer via the direct DU-to-DU channel has completed. Downlink user data 623 (received from the CU at the handover target DU) may then be transferred from the handover target DU to the UE device. Uplink user data 625 may subsequently be transferred from the UE device 510 to the handover target DU 514, and from the handover target DU 514 to the CU 516. The CU may send a UE context release command to the handover source DU 512 as indicated by the arrow labeled 11. The handover source DU may then release the UE context and send a UE context release complete message (the arrow labeled 12) to the CU, indicating that the handover workflow has been completed.

Note that in some implementations, the order of some of the handover-related interactions may differ from that shown in FIG. 5 and FIG. 6. For example, a message indicating that the buffer contents transfer is complete may be sent from the handover target DU to the handover source DU at any time after the buffer contents are received, and may not necessarily be sent after the handover target DU sends an uplink RRC message transfer message to the CU as shown in FIG. 6. In at least some embodiments, the direct DU-to-DU channel or connection may be set up prior to the handover procedure itself (e.g., during initialization of the DUs), and the handover source DU may transmit buffer contents using such a preexisting channel or connection when an indication of the handover is received at the handover source DU from the CU.

FIG. 7 is a flow diagram illustrating aspects of operations that may be performed to enhance handover performance using direct network channels between distributed units of radio-based applications, according to at least some embodiments. As shown in element 701, centralized units (CUs) and distributed units (DUs) of a RAN node (e.g., a gNodeB) of a radio-based application (RBA) may be set up using provider network resources in various embodiments. For example, a CU CUI may be set up at a compute instance of a virtualized computing service (VCS) at a provider network data center, while DUs DU1 and DU2 may be set up at respective compute instances on a pair of virtualization servers at edge locations such as client-premise VCS extensions, local zones etc., that are closer to the antennas/radio units of the RBA. Each DU may maintain buffers in which blocks of data (and in some cases associated error detection/correction data) may be retained temporarily in case the blocks have to be retransmitted.

As shown in element 704, CUI may determine that a handover, from DU1 to DU2, of network traffic associated with transfer or transmission of user data between a pair of devices (e.g., a pair of user equipment (UE) devices UED1 and UED2, or a UE device UED1 and a server) is to be performed. CUI may notify both DU1 and DU1 regarding the handover, e.g., using message similar to those shown in the handover workflow illustrated in FIG. 5 and FIG. 6.

In response to receiving an indication of the handover, DU1 may transfer at least some contents of its HARQ and/or ARQ buffers via a direct network channel to DU2 (element 707). The channel may be set up after the indication of the handover is received at DU1, or a pre-existing channel (which may have been set up during DU initialization) may be used.

DU2 may receive the buffer contents sent by DU1, and store them in its own buffers (element 710). DU2 may, if needed, use the buffer contents to perform retransmission operations pertaining to the data transfer (e.g., in response to retransmission requests received from the receiving-side component of the data transfer associated with the pair of UE devices) in various embodiments. DU1 may delete the contents of its HARQ/ARQ buffers only after receiving an indication from DU2 that the contents have been successfully received at DU2. DU2 may thus avoid the overhead associated with populating its buffers via CUI (which may take longer than the copying of the buffer contents, and may thus worsen retransmission times and/or handover performance). It is noted that in various embodiments, some of the operations shown in the flow chart of FIG. 7 may be implemented in a different order than that shown in the figure, or may be performed in parallel rather than sequentially. Additionally, some of the operations shown in FIG. 7 may not be required in one or more implementations.

Figure 8:
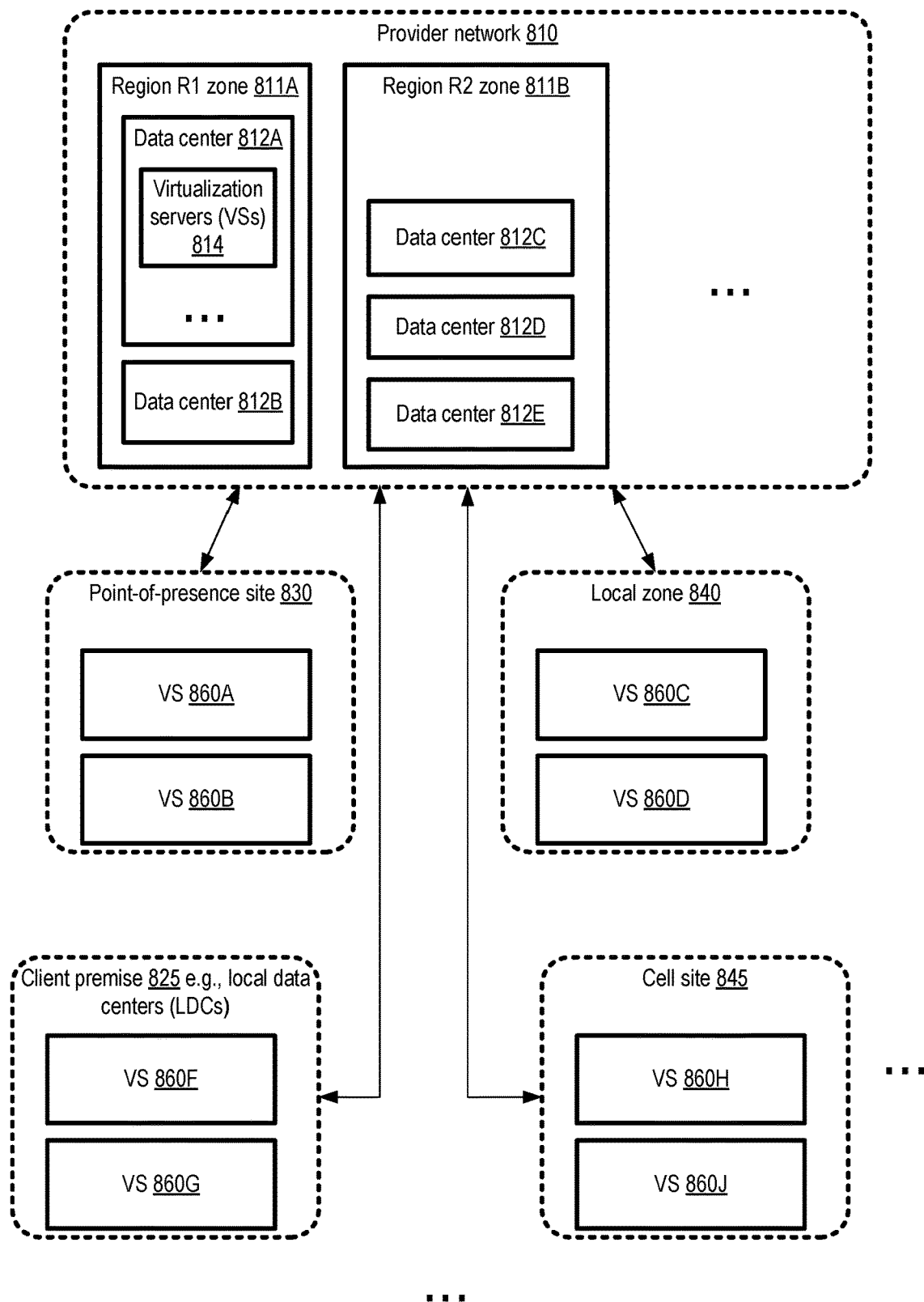
FIG. 8 illustrates example premises and sites at which virtualization servers used for radio-based applications may be deployed, according to at least some embodiments.

FIG. 8 illustrates example premises and sites at which virtualization servers used for radio-based applications may be deployed, according to at least some embodiments. In the embodiment depicted in FIG. 8, resources of a provider network 810 may be organized into regional zones, such as region R1 zone 811A and region R2 zone 811B. A given regional zone may in turn comprise one or more data centers located relatively close to each other (e.g., within the same state or metropolitan area). Region R1 811A comprises data centers 812A and 812B, while region R2 zone 811B comprises data centers 812C. 812D and 812E in the example shown in FIG. 8. Each such data center 812 may comprise control plane servers and data plane resources (including virtualization servers such as VSs 814) and artifacts of one or more services such as a virtualized computing service (VCS) similar to VCS 110 of FIG. 1 and/or a radio-based application management service (RBAMS) similar to RBAMS 192 of FIG. 1.

Compute instances which can be used to run virtualized network functions of DUs, CUs and core networks of radio-based applications as described above may be configured, in response to programmatic requests from clients, at virtualization servers locates at a variety of facilities other than the provider network's own data centers 812 in the depicted embodiment. Such facilities may include, among others, cell sites 845, client premises 825 such as local data centers, local zones 840, and/or point-of-presence sites 830 in different embodiments. As shown, virtualization servers (VSs) 860A and 860B may be set up, e.g., within a single rack, at point-of-presence site 830. VSs 860C and 860D may be set up at local zone 840, VSs 860F and 860G may be set up at a client-owned premise 825, and VSs 860H and 860J may be set up at a cell site 845 (e.g., a room or group of rooms located next to cell towers with antennas). Other types of facilities and locations may be used for VSs in some embodiments, instead or in addition to those shown in FIG. 8. From each VS at a given facility, connectivity may be established with the control plane servers of the provider network in various embodiments, and with radio units (RUS) typically located very near or in the facilities. After such connectivity has been verified, in various embodiments virtualized network functions of one or more radio-based applications may be run at the VSs as described earlier. Direct DU-to-DU channels for transferring HARQ/ARQ buffer contents may be established at any of the premises shown in FIG. 8 in some embodiments.

Figure 9:
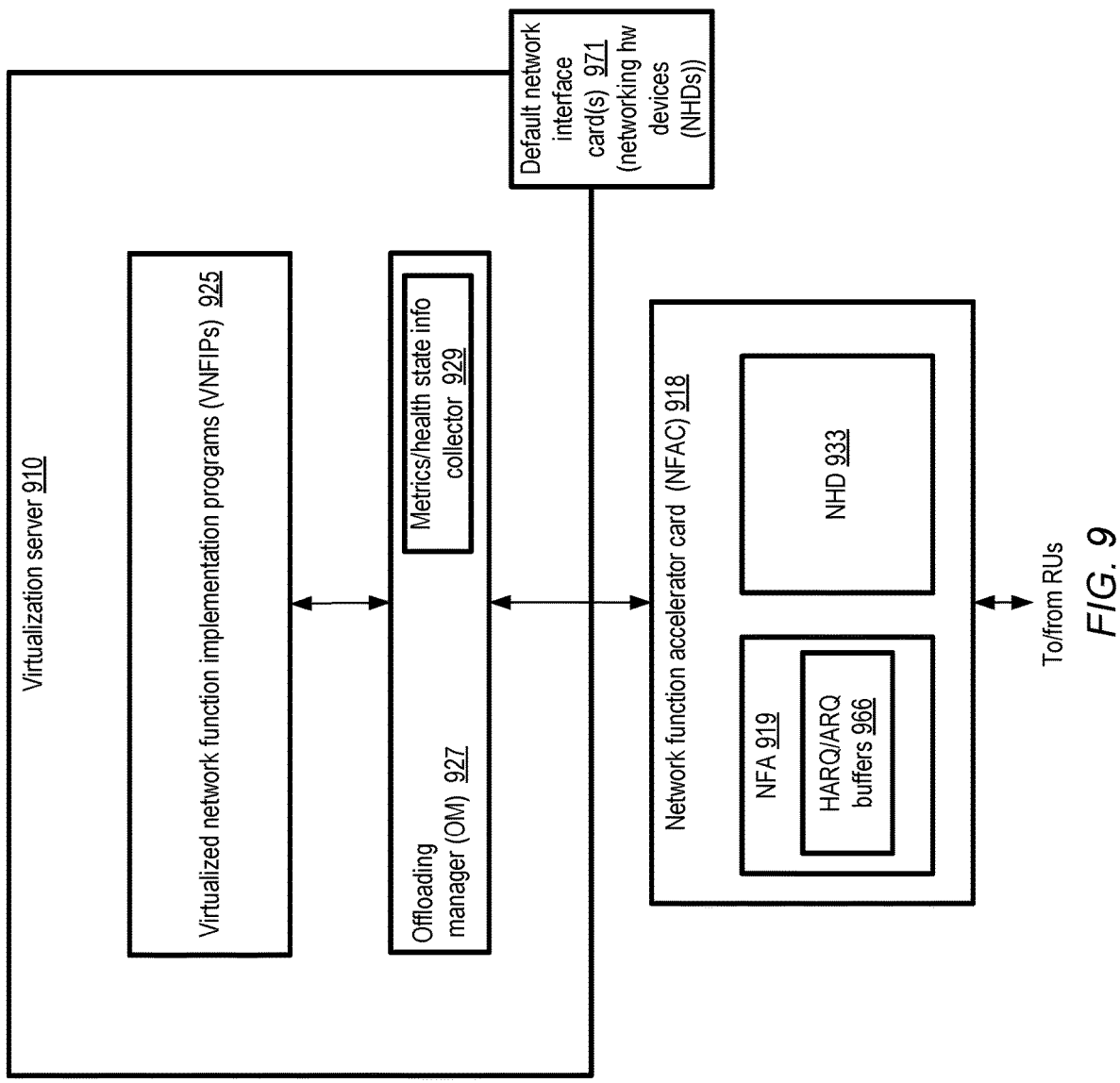
FIG. 9 illustrates example subcomponents of a virtualization server equipped with one or more hardware accelerators optimized for implementing network functions of radio-based applications, according to at least some embodiments.

FIG. 9 illustrates example subcomponents of a virtualization server equipped with one or more hardware accelerators optimized for implementing network functions of radio-based applications, according to at least some embodiments. In the embodiment shown in FIG. 9, one set of network functions of a radio-based application may be executed by virtualized network function implementation programs (VNFIPs) 925 at a compute instance using primary processors (e.g., CPUs) of the virtualization server 910. Another set of network functions of the RBA may be run at a network function accelerator 919 incorporated within a network function accelerator card (NFAC) 918. The NFA may for example comprise a chip set optimized to run the offloaded network functions. Offloading some network functions to the NFAC may enable more of the primary processors' computing capacity to be utilized for other tasks in the depicted embodiment, and the offloaded network functions may in some cases be executed more quickly than if they were to be executed using the primary processors.

The virtualization server 910 may include one or more default network interface cards 971, referred to as networking hardware devices or NHDs. The NFAC 918 may comprise its own NHD 933. An offloading manager (OM) 927, such as a virtualization manager or hypervisor, may be responsible for communicating with the NFAC. For example, results of some network functions executed by the VNFIPs may be provided to the NFA 919 by the offloading manager 927. Metrics and health state information collector 929 may gather various types of metrics from the NFAC, and such metrics may be presented to the client on whose behalf the RBA is being executed at the VS upon request in some embodiments.

In at least one embodiment, DU network functions at the HARQ and/or ARQ layers may be run at the NFA 919. The NFA 919 may comprise HARQ/ARQ buffers 966 in such embodiments. The contents of such buffers may be transferred to another DU, running for example at a different virtualization server, via a direct DU-to-DU network channel during a handover procedure similar to that shown in FIG. 5 and FIG. 6 in some embodiments. In some embodiments, the direct channel may utilize the NHD 933 on the NFAC, while in other embodiments a default network interface card 971 may be used for the direct channel.

Figure 10:
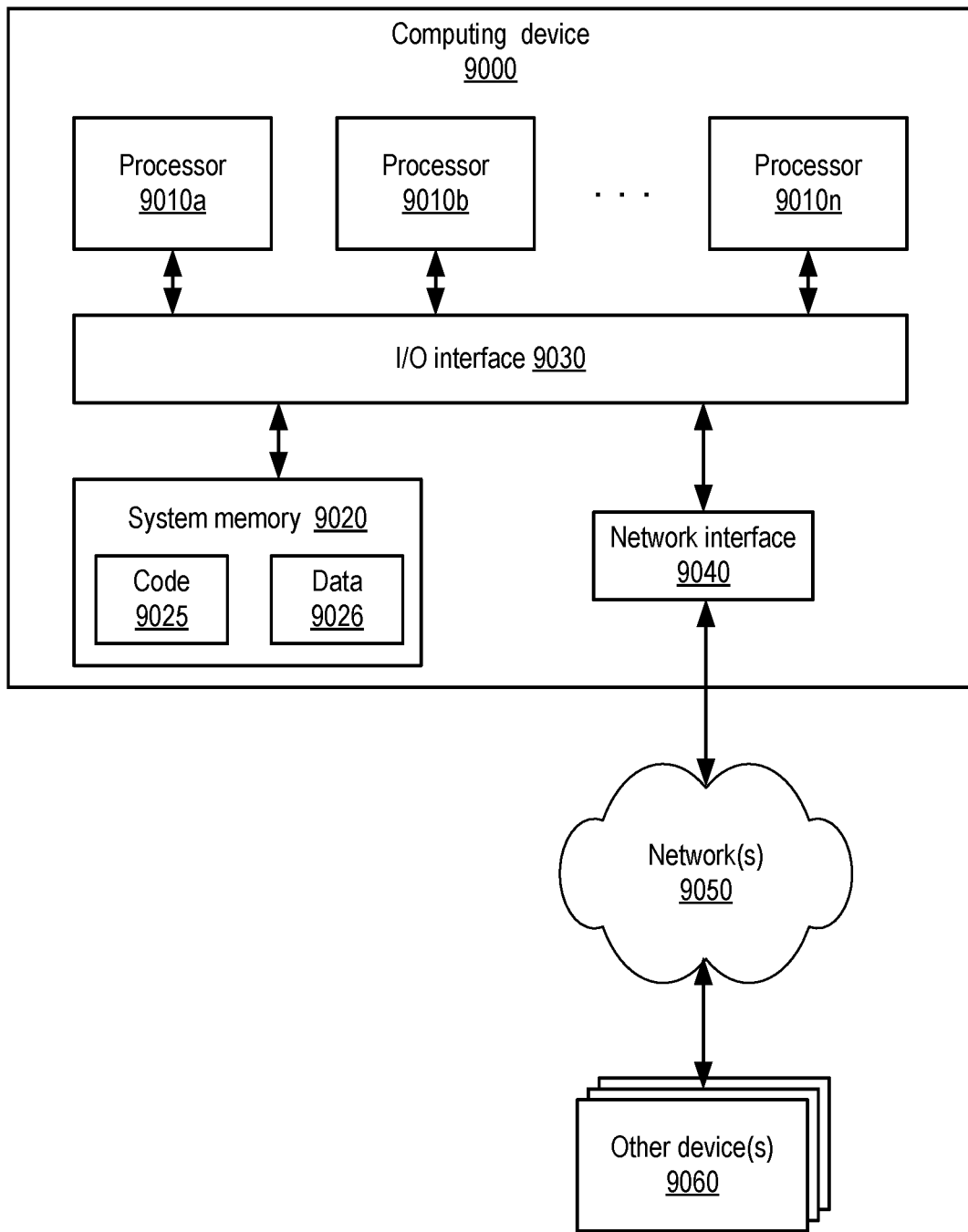
FIG. 10 is a block diagram illustrating an example computing device that may be used in at least some embodiments.

In at least some embodiments, a server that implements the types of techniques described herein (e.g., various functions of a provider network service such as a VCS or an RBAMS, including functions within the provider network service as well as at extension sites), may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multi-processor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferro-electric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 9. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   a centralized unit (CU) of a fifth generation (5G) radio access network (RAN) of a radio-based application; and
   a first distributed unit (DU) of the RAN; and
   a second DU of the RAN;
   wherein the CU is configured to:
      determine that a handover, from the first DU to the second DU, of network traffic associated with a transfer of data between a first user equipment (UE) device and a second device via the radio-based application is to be initiated; and
   wherein the first DU is configured to:
      retain, in a first buffer during respective time intervals, respective blocks of user data being transmitted between the first UE device and the second device via the radio-based application, wherein an individual block is deleted from the first buffer by the first DU after the first DU determines that the individual block does not have to be retransmitted;
      in response to receiving an indication of the handover from the CU, transmit at least a portion of contents of the first buffer to the second DU via a direct network channel configured between the first DU and the second DU, wherein the direct network channel does not include the CU as an intermediary; and
   wherein the second DU is configured to:

store, in a second buffer, the portion of contents of the first buffer received from the first DU via the direct network channel; and after the handover is completed, utilize the portion of contents to perform a retransmission operation pertaining to the transfer of data between the first UE device and the second device, without requiring the portion of contents to be obtained via the CU.

2. The system as recited in claim 1, wherein the first buffer is maintained at one of: (a) a layer of a radio-based technology stack at which a hybrid automatic repeat request (HARQ) algorithm is implemented, or (b) a layer of a radio-based technology stack at which an automatic repeat request (ARQ) algorithm is implemented.

3. The system as recited in claim 1, wherein the first DU is further configured to:

initiate establishment of the direct network channel after the first DU receives the indication of the handover.

4. The system as recited in claim 1, wherein the direct network channel is established prior to receiving of the indication of the handover by the first DU.

5. The system as recited in claim 1, wherein the first DU is implemented at least in part at a virtualization host of a virtualized computing service of a provider network, and wherein the virtualization host is located at an edge location of the provider network.

6. A computer-implemented method, comprising:

determining, by a first distributed unit (DU) of a radio-based application, that traffic associated with a particular user equipment (UE) device is to be handed over to a second DU of the radio-based application;

in response to said determining, transmitting, by the first DU, at least a portion of contents of a first buffer to the second DU of the radio-based application via a network channel configured between the first DU and the second DU, wherein the contents include a block of data transmitted from the particular UE device, wherein the network channel does not include a centralized unit (CU) of the radio-based application as an intermediary;

storing, in a second buffer by the second DU, the block of data; and utilizing, by the second DU, the block of data to perform a retransmission operation pertaining to the traffic associated with the particular UE device.

7. The computer-implemented method as recited in claim 6, wherein the first buffer is maintained at one of: (a) a layer of a radio-based technology stack at which a hybrid automatic repeat request (HARQ) algorithm is implemented, or (b) a layer of a radio-based technology stack at which an automatic repeat request (ARQ) algorithm is implemented.

8. The computer-implemented method as recited in claim 6, further comprising:

establishing the network channel after the first DU determines that the traffic associated with the particular user equipment (UE) device is to be handed over to the second DU.

9. The computer-implemented method as recited in claim 6, further comprising:

establishing the network channel during an initialization of the first DU, prior to determining by the first DU that the traffic associated with the particular user equipment (UE) device is to be handed over to the second DU.

10. The computer-implemented method as recited in claim 6, wherein the first DU is implemented at least in part at a virtualization host of a virtualized computing service of a provider network, wherein the virtualization host is located at an edge location of the provider network.

11. The computer-implemented method as recited in claim 6, wherein said determining comprises:

receiving, at the first DU, a message indicating a handover of the traffic, wherein the message is received from a centralized unit (CU) of the radio-based application, wherein at least a portion of the CU is implemented at a virtualization host of a virtualized computing service of a provider network.

12. The computer-implemented method as recited in claim 6, the first DU is linked to a first centralized unit (CU) of the radio-based application, and wherein the second DU is linked to a second CU of the radio-based application.

13. The computer-implemented method as recited in claim 6, wherein the block of data is transferred to the second DU using a layer-2 protocol of the Open Systems Interconnection (OSI) model, without utilizing a layer-3 protocol of the OSI model.

14. The computer-implemented method as recited in claim 6, wherein the first buffer is incorporated within an offloading card of a server, wherein the first DU comprises one or more network functions including at least one network function implemented at the offloading card, and wherein the offloading card is linked to a primary processor of the server via a peripheral interface.

15. The computer-implemented method as recited in claim 6, further comprising:

in response to determining that a handover of the traffic is complete, closing the network channel.

16. A non-transitory computer-accessible storage medium storing program instructions that when executed on a processor:

determine, by a first distributed unit (DU) of a radio-based application, that traffic associated with a particular user equipment (UE) device is to be handed over to a second DU of the radio-based application;

transmit, by the first DU in response to a determination that the traffic is to be handed over, at least a portion of contents of a first buffer to the second DU of the radio-based application via a network channel configured between the first DU and the second DU, wherein the contents include a block of data transmitted from the particular UE device, wherein the network channel does not include a centralized unit (CU) of the radio-based application as an intermediary;

store, in a second buffer by the second DU, the block of data; and utilize, by the second DU, the block of data to perform a retransmission operation pertaining to the traffic associated with the particular UE device.

17. The non-transitory computer-accessible storage medium as recited in claim 16, wherein the first buffer is maintained at one of: (a) a Medium Access Control (MAC) layer of a radio-based technology stack, or (b) a Radio Link Control (RLC) layer of a radio-based technology stack.

18. The non-transitory computer-accessible storage medium as recited in claim 16, storing further program instructions that when executed on the processor:

cause the network channel to be established after the first DU determines that the traffic associated with the particular user equipment (UE) device is to be handed over to the second DU.

19. The non-transitory computer-accessible storage medium as recited in claim 16, storing further program instructions that when executed on the processor:

cause the network channel to be established prior to the determination by the first DU that the traffic associated with the particular user equipment (UE) device is to be handed over to the second DU.

20. The non-transitory computer-accessible storage medium as recited in claim 16, wherein the first DU is implemented at least in part at a first virtualization server of a virtualized computing service of a provider network, and wherein the second DU is implemented at least in part at a second virtualization server of a virtualized computing service of a provider network.

* * * * *